United States Patent Office 2,978,301
Patented Apr. 4, 1961

2,978,301
PROCESS AND COMPOSITION FOR THE DISSOLUTION OF COPPER

Paul H. Margulies, Snyder, and James E. Kressbach, Eggertsville, N.Y., assignors to Food Machinery and Chemical Corporation, San Jose, Calif.

No Drawing. Filed Jan. 11, 1957, Ser. No. 633,547

18 Claims. (Cl. 41—42)

This invention relates to the dissolving of copper, and particularly to the dissolving of copper in catalyzed aqueous persulfate solutions.

There are many applications in which it is desirable to dissolve metallic copper. For example it frequently is desired to remove small amounts of copper from the surfaces of fragile or peculiarly shaped objects, where mechanical machining is not practical. Likewise, it frequently is desired to mask a pattern on the surface of a copper sheet, for example in the production of fine and uniform screens or in the production of printed electrical circuits, and to dissolve the copper in areas not covered by the masking material. A further application where it is desirable to dissolve copper is in the production of copper printing plates by photoengraving.

Heretofore, strong mineral acids, e.g. nitric or sulfuric acids, ferric chloride solutions, and, occasionally, persulfate solutions, have been the agents most often used to dissolve copper. These agents all have disadvantages, however. For example the strong acids tend to attack materials used in masking patterns, and thereby to cause the copper to be dissolved in ill-defined fashion. Furthermore, these acids are strongly corrosive and require the use of special process equipment. Likewise, the acids generate noxious fumes, and removal of dissolved copper from the acids is difficult and for this and other reasons disposal of the spent acid solutions is difficult. In the case of the ferric chloride solutions, this agent in common with the acids is quite corrosive, requiring the use of special equipment, and gives rise to noxious fumes. Furthermore the ferric chloride solutions must be used at high ferric chloride concentrations, and accordingly solid reaction products easily form in them as they become loaded with dissolved copper. This of course interferes with clean copper dissolution. Here again, also, disposal of the exhausted solution which is highly corrosive and toxic presents a serious problem, and copper recovery form ferric chloride is not feasible, although economically it is very important.

Persulfate solutions do not share these disadvantages with the acid and ferric chloride solutions. They are only mildly acidic, they do not generate noxious fumes, they do not attack masking materials, they produce only soluble reaction products and they can be disposed of readily following simple removal of dissolved copper. However, the persulfate solutions are extremely slow in dissolving copper. Accordingly, they have not met with widespread use in the solution of copper metal.

It is a feature of this invention to provide a mildly acidic, non-corrosive aqueous persulfate solution and a method of dissolving metallic copper rapidly with this solution.

It is a further feature of this invention to provide such a persulfate solution which does not produce solid reaction products during dissolution of the copper, and which following use can be stripped of dissolved copper and disposed of readily without special precautions.

The copper-dissolving solutions of this invention are aqueous solutions containing about 10 to 50 parts by weight of a persulfate, and preferably about 20 to 30 parts by weight of this ingredient, and in addition containing a small, catalytic amount of a metal catalyst. The metal employed as a catalyst is a metal having an electrode potential more negative than the electrode potential of copper, and which therefore displaces copper metal. To be useful as a catalyst a given metal furthermore must be available in a form in which it can be dissolved in water, for example in the form of a soluble salt or other compound or complex. The catalyzed aqueous sulfate solution is mildly acidic, generally non-corrosive and free of noxious fumes, and can be stripped of dissolved copper and disposed of readily following use.

In the dissolution of copper metal with the solution of this invention, a copper body or a body partially composed of copper is contacted with the solution, and the solution is subjected to agitation, for example by immersing the copper in the solution, by spraying or brushing the solution onto the copper, or by other obvious means. When an immersion operation is employed it is preferred to agitate the solution to assure that the copper is contacted at all times with fresh solution.

The rate of dissolution of copper in the catalyzed aqueous persulfate solution is as much as 5–10 or more times the rate of dissolution of copper in uncatalyzed aqueous persulfate solutions. Dissolved copper present in the solution can be recovered readily, for example by precipitation, electroplating, cementation on iron, or roasting of the dried solution.

The catalyzed aqueous persulfate solution employed herein contains about 10 to 50 parts by weight of a persulfate, and preferably about 20 to 30 parts by weight of this ingredient. The persulfates are active oxygen containing salts of persulfuric acid. It is preferred for present purposes to employ ammonium persulfate, by reason of its ready and high degree of solubility in water, although other persulfates, for example sodium persulfate, or mixtures of persulfates, having the requisite solubility can be employed.

The catalyst component of the present solutions is comprised of one or more metals which have electrode potentials more negative than the electrode potential of copper, and which therefore displace copper from metallic copper samples immersed in the present aqueous solutions. As described in "Oxidation Potentials," Wendell and Latimer, 2nd edition, Prentiss Hall, Inc., New York (1952), metals having such electrode potentials include silver, mercury, lead, palladium, platinum, gold, bismuth and rhodium. It is preferred herein to employ mercury, silver, gold or platinum, or combinations thereof, as these metals are available in compounds which are readily soluble in water and in aqueous persulfate solutions are particularly free from the formation of insoluble complexes and compounds.

The metal is introduced into the aqueous persulfate solution as a soluble salt or other water-soluble compound, and is employed in the solution in a catalytic amount. This catalytic amount is a small amount of the material, that is an amount which may be expressed conveniently in terms of parts per million. Activity of the catalyst has been found to be greatest when the metal is present as ions in the solution to the extent of about 10 parts per million, although greater or lesser amounts of the metal likewise catalyze the copper dissolution. In practice, it is preferred to employ in the neighborhood of 1 to 100 parts per million of the metal ion in the solution, for the reasons that handling of less than these amounts is difficult and that use of more of the metal is wasteful, although it has been found that less than 1 or more than 100 parts per million of the catalyst can be employed.

The solubility of the metal compound added, or of complexes or reaction products formed by the metal in the aqueous persulfate solution, may be such as to inactivate a portion of the metal added. Accordingly, it is important to employ a sufficient amount of a metal compound to allow for such inactivation and at the same time to provide the desired catalytic amount of metal in the solution. The metal content of the solution can be determined readily by filtering undissolved metal and other impurities from the solution and thereafter analyzing the solution by standard analytical means. As an example of an instance where an excess of a metal compound must be added, when silver salts are dissolved in water containing chlorides, some of the silver ions are insolubilized by formation of silver chloride and the silver thus inactivated must be replaced by addition of more of the soluble salt. Likewise, bismuth salts form insoluble hydrated oxides with water, and either these oxides must be destroyed or their formation retarded, or an excess of bismuth salt must be added to the aqueous persulfate solution.

The present aqueous persulfate solution prior to use has an acid pH, normally about 4. As the persulfate is destroyed, sulfuric acid is formed and the pH of the solution gradually diminishes until it reaches a point of about pH 2. These pH values are not critical, however, and catalyzed, aqueous persulfate solutions having any pH on the acid side of neutral are suitable herein.

No critical temperature of operation exists in the present method of dissolving copper, it being essential only to avoid freezing or boiling of the dissolving solution. it is preferred to operate at or about room temperature, as this eliminates the need for special heating or cooling apparatus. It has been found, however, that heated, e.g. about 100° F. or higher, catalyzed aqueous persulfate solutions dissolve copper somewhat more rapidly than do such solutions at room temperature.

The present dissolution method operates through coaction of the metal catalyst and the persulfate. It is believed that as the metal displaces copper from the metallic copper sample, it forms on the copper sample a number of tiny corrosion cells which operate to increase the rate of dissolution of copper in the catalyzed aqueous persulfate solution. However, the cells also operate to cause formation of hydrogen gas which collects on the surface of the copper sample, thereby preventing contact of the solution with the copper sample and decreasing the dissolution rate. The active oxygen-containing persulfate is believed to overcome this retardation of dissolution by reacting with the hydrogen gas and thereby removing it from the surface of the copper sample.

The following examples are given by way of illustration only, and are not intended to limit the operating procedures or materials employed in carrying out the present method.

Copper foil samples measuring 1″ x 1″ x .014″ and weighing about 0.19 g., were immersed in 250 ml. beakers containing 100 ml. samples of various aqueous ammonium persulfate solutions. The solutions, which were at room temperature, were agitated with a mechanical stirrer during the immersion of the copper samples, and the times for complete dissolution of the copper were noted. The solutions employed and the times required for complete dissolution are recorded in Table I, which follows.

Table I

| Persulfate, Percent | Catalyst | Amount of Catalyst g. metal ion | Amount of Catalyst p.p.m. metal ion | Dissolution Time, min. |
|---|---|---|---|---|
| 25 | | | | 16.0 |
| 10 | Mercuric Chloride | 0.0005 | 5.0 | 8.5 |
| 20 | do | 0.0005 | 5.0 | 4 to 4.5 |
| 25 | do | 0.0005 | 5.0 | 3.5 |
| 30 | do | 0.0005 | 5.0 | 4 to 4.5 |
| 40 | do | 0.0005 | 5.0 | 12.5 |
| 45 | do | 0.0005 | 5.0 | 13.0 |
| 25 | do | 0.0005 | 0.5 | 4.5 |
| 25 | do | 0.0001 | 1.0 | 3.5 |
| 25 | do | 0.0005 | 5.0 | 3.5 |
| 25 | do | 0.001 | 10.0 | 2.5 |
| 25 | do | 0.01 | 100.0 | 3.0 |
| 25 | do | 0.1 | 1,000.0 | 4.5 |
| 25 | do | 0.5 | 5,000.0 | 4.5 |
| 25 | Silver Nitrate [1] | 0.00035 | 3.5 | 6.0 |
| 25 | do [1] | 0.00063 | 6.3 | 4.5 |
| 25 | do [1] | .0038 | 38.0 | 6.0 |
| 25 | Rhodium Sulfate | 0.0001 | 1.0 | 5.5 |
| 25 | do | 0.0005 | 5.0 | 5.5 |
| 25 | do | 0.0020 | 20.0 | 12.0 |
| 25 | HAuCl₄ (Gold) | 0.0005 | 5.0 | 7.0 |
| 25 | do | 0.0020 | 20.0 | 6.5 |
| 25 | (NH₄)₂Pt(Cl)₆ (Platinum) | .0004 | 4.0 | 7.5 |
| 25 | | 0.0020 | 20.0 | 6.0 |

[1] Distilled H₂O solution.

In each of the above experiments the copper metal samples were immersed in the indicated solutions. The procedure was similar in each case in order to permit direct comparison of results. However, other methods of contacting the catalyzed aqueous persulfate solution have been employed with equal or superior results. For example, where the solution is applied to the copper metal with force, such as by spraying under pressure, by brushing, with rubbing and the like, the mechanical action involved aids in removal of copper from the sample. In a typical experiment, a copper foil sample of the above type was sprayed under a pressure of about 15 p.s.i. with an aqueous solution of 25% ammonium persulfate and 10 parts per million of mercuric ion (introduced as mercuric chloride). The copper sample dissolved in one minute. Variations of the procedures illustrated will be obvious to one versed in the art.

The present method of dissolving copper may be extended to the dissolution of other metals, provided a persulfate solution is employed which in the absence of catalyst will dissolve such other metal, albeit very slowly, and provided further that the metal catalyst, when it is present as ions in the persulfate solution, will displace metal from the metal sample to be dissolved. For example it has been found that zinc can be dissolved in acidified persulfate solutions catalyzed with compounds of metals which displace zinc, and it likewise has been found that iron and nickel can be dissolved by this method. In the case of zinc dissolution the "normal" pH 4 persulfate solutions do not dissolve metallic zinc. Accordingly, the persulfate solution must be acidified to provide a medium in which the zinc metal will dissolve and which therefore can be catalyzed by addition of a compound of a proper metal. It is important in the dissolution of any selected metal that the present concentration of persulfate be employed, and that a metal catalyst be employed which is soluble in the aqueous persulfate solution.

What is claimed is:

1. Method of dissolving metallic copper, comprising contacting the copper with an aqueous solution containing as solutes therein, about 10% to 45% of a persulfate and a catalytic amount of ions of a metal having an electrode potential more negative than the electrode potential of copper.

2. Method of dissolving metallic copper, comprising contacting the copper with an aqueous solution containing as solutes therein, about 10% to 45% of ammonium persulfate and a catalytic amount of ions of a metal having an electrode potential more negative than the electrode potential of copper.

3. Method of dissolving metallic copper, comprising contacting the copper with an aqueous solution containing as solutes therein, about 20% to 30% of ammonium persulfate and a catalytic amount of ions of a metal having an electrode potential more negative than the electrode potential of copper.

4. Method of claim 2 wherein the metal is a metal from the group consisting of mercury, silver, gold and platinum.

5. Method of claim 2 wherein the metal is mercury.
6. Method of claim 2 wherein the metal is silver.
7. Method of claim 2 wherein the metal is gold.
8. Method of claim 2 wherein the metal is platinum.

9. Aqueous solution useful in dissolving metallic copper, said solution containing as solutes therein, about 10% to 45% of a persulfate and a catalytic amount of ions of a metal having an electrode potential more negative than the electrode potential of copper.

10. Aqueous solution useful in dissolving metallic copper, said solution containing as solutes therein, about 10% to 45% of ammonium persulfate and a catalytic amount of ions of a metal having an electrode potential more negative than the electrode potential of copper.

11. Aqueous solution useful in dissolving metallic copper, said solution containing as solutes therein, about 20% to 30% of ammonium persulfate and a catalytic amount of ions of a metal having an electrode potential more negative than the electrode potential of copper.

12. Aqueous solution of claim 10 wherein the metal is from the group consisting of mercury, silver, gold and platinum.

13. Aqueous solution of claim 10 wherein the metal is mercury.

14. Aqueous solution of claim 10 wherein the metal is silver.

15. Aqueous solution of claim 10 wherein the metal is gold.

16. Aqueous solution of claim 10 wherein the metal is platinum.

17. Method of dissolving metallic copper, comprising contacting the copper with an aqueous solution containing as solutes therein, about 10% to 45% of a persulfate and a catalytic amount of ions of mercuric chloride.

18. Aqueous solution useful in dissolving metallic copper, said solution containing as solutes therein, about 10% to 45% of a persulfate and a catalytic amount of ions of mercuric chloride.

References Cited in the file of this patent

UNITED STATES PATENTS

| 1,994,500 | Boller | Mar. 19, 1935 |
| 2,647,864 | Goffredo | Aug. 4, 1953 |
| 2,701,186 | Hendrich et al. | Feb. 1, 1955 |